(12) United States Patent
Tan et al.

(10) Patent No.: US 10,317,515 B2
(45) Date of Patent: Jun. 11, 2019

(54) APPARATUS FOR IDENTIFYING OBJECTS OUTSIDE OF A LINE-OF-SIGHT

(71) Applicant: Wisconsin Alumni Research Foundation, Madison, WI (US)

(72) Inventors: Yixuan Tan, Madison, WI (US); Xingze Wang, Stanford, CA (US); Zongfu Yu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 67 days.

(21) Appl. No.: 15/694,119

(22) Filed: Sep. 1, 2017

(65) Prior Publication Data

US 2019/0072655 A1    Mar. 7, 2019

(51) Int. Cl.
*G06N 3/08* (2006.01)
*G01S 7/491* (2006.01)
*G06N 3/04* (2006.01)

(52) U.S. Cl.
CPC ............ *G01S 7/4914* (2013.01); *G06N 3/04* (2013.01); *G06N 3/08* (2013.01)

(58) Field of Classification Search
CPC .... G01S 7/4914; G01S 7/4913; G01S 7/4912; G01S 7/481; G01S 7/4865; G06N 3/04; G06N 3/08; G06N 3/02
See application file for complete search history.

(56) References Cited

U.S. PATENT DOCUMENTS

| | | | | |
|---|---|---|---|---|
| 2007/0086624 | A1* | 4/2007 | Breed | G06K 9/00362 382/104 |
| 2011/0284724 | A1* | 11/2011 | Meyers | B82Y 10/00 250/208.1 |
| 2012/0075423 | A1 | 3/2012 | Kirmani et al. | |
| 2013/0100250 | A1* | 4/2013 | Raskar | G01S 17/89 348/46 |
| 2013/0127980 | A1* | 5/2013 | Haddick | G06F 3/013 348/14.08 |
| 2013/0278631 | A1* | 10/2013 | Border | G02B 27/017 345/633 |
| 2014/0347676 | A1* | 11/2014 | Velten | G01B 11/2513 356/614 |
| 2016/0014393 | A1* | 1/2016 | Kadambi | G01S 17/89 348/50 |
| 2017/0123487 | A1* | 5/2017 | Hazra | G06F 3/015 |
| 2017/0132801 | A1* | 5/2017 | Trenholm | H04N 5/372 |
| 2017/0278258 | A1* | 9/2017 | Kurz | G06T 7/593 |
| 2018/0068206 | A1* | 3/2018 | Pollach | G06K 9/00791 |
| 2018/0252815 | A1* | 9/2018 | Shintani | G01S 17/89 |
| 2018/0268256 | A1* | 9/2018 | Di Febbo | G06K 9/6256 |

(Continued)

OTHER PUBLICATIONS

Bin Bai et al.; Imaging around corners with single-pixel detector by computational ghost imaging; Optik—International Journal for Light and Electron Optics; vol. 147, Dec. 2016, pp. 1-12; US.

*Primary Examiner* — John R Lee
(74) *Attorney, Agent, or Firm* — Boyle Fredrickson, S.C.

(57) ABSTRACT

An optical field sensor is used to make phase measurements over an area of light reflected from an object outside a field of view of the light field sensor. These phase measurements are applied to a machine learning system trained with similar phase measurements from objects outside of a field of view to identify the object within a class of objects subject to the training.

17 Claims, 3 Drawing Sheets

(56) References Cited

U.S. PATENT DOCUMENTS

2018/0293739 A1* 10/2018 Gupta .................... G06T 7/248
2018/0296281 A1* 10/2018 Yeung .................... A61B 34/30
2018/0322623 A1* 11/2018 Memo .................... G06T 7/0004
2018/0364813 A1* 12/2018 Sayah .................... G06F 3/0346

* cited by examiner

APPARATUS FOR IDENTIFYING OBJECTS OUTSIDE OF A LINE-OF-SIGHT

STATEMENT REGARDING FEDERALLY SPONSORED RESEARCH OR DEVELOPMENT

This invention was made with government support under IIP1549673 awarded by the National Science Foundation. The government has certain rights in the invention.

CROSS REFERENCE TO RELATED APPLICATION

--

BACKGROUND OF THE INVENTION

The present invention relates to a system that can identify an object from its reflected light when the object is not within the line-of-sight of the light sensor, for example, as may occur when the object is around a corner with respect to the light sensor.

A fundamental limitation of optical imaging is the requirement that the object being imaged be within a line-of-sight of the image sensor, that is, that there be a straight path from the object being imaged to the image sensor that does not require reflection off an intervening diffuse surface.

The ability to identify objects when there is no line-of-sight path between the object and image sensor (effectively the ability to see around corners) could prove valuable in in a variety of applications including: machine vision systems for self-driving cars, where such a capability would allow the car to react more quickly to hazards outside of the line-of-sight; search and rescue operations, where a direct line-of-sight maybe blocked by rubble or the like; or in medical imaging, for example, endoscopy, where it may be desired to see around an obstruction.

US patent publication 2012/0075423 to Ahmed Kirmani et al, describes a system that can effectively see around corners by using extremely short (femtosecond) laser pulses and a high-speed (picosecond) camera to make time-of-flight measurements of light travel to deduce the shape of the object. Multiple images are taken with different camera rotations and using points of illumination by the laser to address variations in time-of-flight measurements to reconcile different times of flight caused by different numbers of reflections as the light passes around obstructions.

An alternative technique of effectively seeing around corners is described in the paper "Imaging around corners with single-pixel detector by computational ghost imaging" by Bin Bai, Jianbin Liu, Yu Zhou, Songlin Zhang, Yuchen He, Zhuo Xu, arXiv:1612.07120 [cs.CV]. This paper describes a system that projects a speckle pattern on the object to be imaged and detects reflected light off the object at a single pixel sensor having no direct line-of-sight path to the object. A correlation processes between the speckle and light received is then used to reconstruct the object.

Each of these techniques requires relatively time-consuming collection of multiple sequential partial images before a complete image can be generated.

SUMMARY OF THE INVENTION

The present invention recasts the problem of imaging around a corner to the problem of identifying an object around a corner thereby providing a system that can identify an object outside a line-of-sight with as little as a single image. The invention captures a cluster of correlated phase shifts received indirectly from the imaged object when the imaged object is illuminated with a coherent light source. This phase information appears to be resistant to corruption by reflections off of diffuse surfaces, for example, intervening walls, allowing the object to be identified even after an image is no longer recoverable. The necessary processing to identify objects from this phase information can be provided by a trained machine learning system.

Specifically, then, in one embodiment, the invention provides an optical system for non-line-of-sight object identification and includes a coherent light source together with an optical field sampler. The optical field sampler provides a two-dimensional array of light sensor elements positionable to receive reflections of light from a non-line-of-sight object illuminated by the coherent light source and generates a corresponding array of light sensor signals. A machine learning system receives the array of light sensor signals and processes them according to training by a training set to identify a given object within an object class of different objects. The training set links different objects of the object class to light sensor signals associated with the different objects when those different objects are not within a line-of-sight of a light sensor collecting the light sensor signals and are illuminated by a continuous wave coherent light source.

It is thus a feature of at least one embodiment of the invention to extract object identification information from received reflected light even when an image cannot be formed. In this way, potential real-time object identification can be obtained without the need for sophisticated cameras or illumination sources with direct proximity between the illumination source and the imaged object.

The machine learning system may use a feature set consisting of light phase at a set of positions over the two-dimensional array of light sensors.

It is thus a feature of at least one embodiment of the invention to employ spatial phase information found in the light to identify the object even when conventional imaging cannot be obtained.

Each light sensor elements sense a phase of received light, for example, being a wavefront sensor or being sensitive to an intensity of received light and making use of constructive and destructive interference from environmental reflections to deduce phase.

It is thus a feature of at least one embodiment of the invention to eliminate the need for precise high-speed cameras or illumination systems. Potentially, the invention can use conventional low-cost imaging technology.

The training set member may provide measures of reflected light of a non-line-of-sight object of the object class indirectly illuminated with coherent radiation communicated between the training objects and a multi-pixel sensor through at least one non-specular reflection.

It is thus a feature of at least one embodiment of the invention to provide a system allowing indirect illumination of the imaged object useful in a variety of applications where access to the imaged object is not available.

The coherent light source may be selected from the group consisting of a laser and a beam expander and a coherent diode.

It is thus a feature of at least one embodiment of the invention to make use of readily available coherent light sources.

The coherent light source may be un-collimated.

It is thus a feature of at least one embodiment of the invention to permit broad area illumination of an imaged object to reduce imaging time.

The coherent light source may provide light in the visible range.

It is thus a feature of at least one embodiment of the invention to permit the use of standard visible imaging technology.

The coherent light source may have a frequency linewidth of less than one gigahertz.

It is thus a feature of at least one embodiment of the invention to use a narrow bandwidth light source to permit ready phase extraction without frequency sensitivity in the receiving system.

The machine learning system is a multilayer neural network, for example, in one embodiment being a convolution neural net.

It is thus a feature of at least one embodiment of the invention to make use of well-established machine learning technologies.

The optical field sampler provides an electronic light sensor array receiving reflected light directly without an intervening lens for optical system projecting of a light image on the light sensor array.

It is thus a feature of at least one embodiment of the invention to eliminate the need for focusing optics.

Generally, the training set may be created from a different environment than that of the object identification It is thus a feature of at least one embodiment of the invention to permit the system to be trained remotely for use in a different environment, for example, as would be required for search and rescue operations.

The optical field sampler may provide a spatial resolution permitting discrimination of optical speckle caused by constructive and destructive interference in the reflected light from the given object.

It is thus a feature of at least one embodiment of the invention permit capture of characteristic phase information from the object being imaged.

These particular objects and advantages may apply to only some embodiments falling within the claims and thus do not define the scope of the invention.

DETAILED DESCRIPTION OF THE PREFERRED EMBODIMENT

Figure 1:
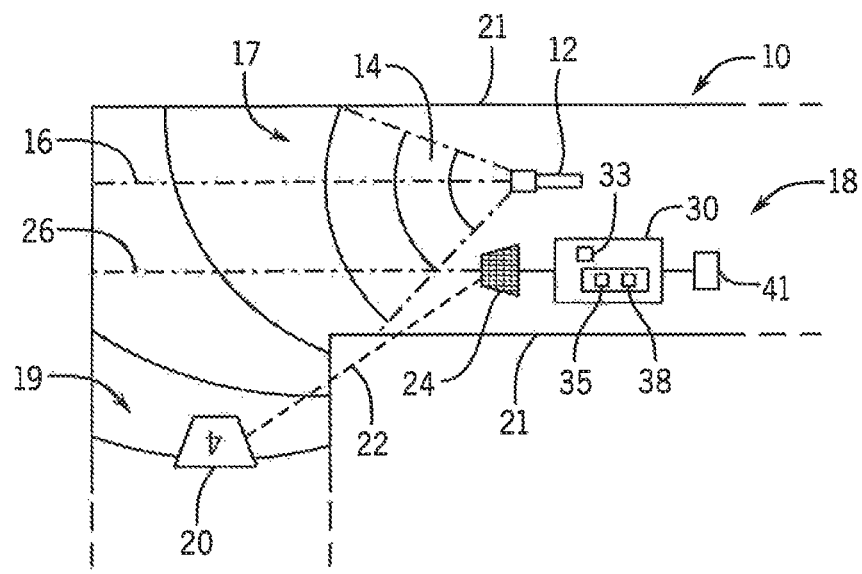
FIG. 1 is a simplified top plan view of the apparatus of the present invention during use for identifying an object and including an optical field sampler and a coherent light source, the latter illuminating an object around a corner out of a line-of-sight of the optical field sampler.

Referring now to FIG. 1, a non-line-of-sight object identification system 10 per the present invention may provide for a continuous wave coherent light source 12 directing light 14 along principal axis 16, for example, down first leg 17 of a hallway 18 or the like. In this example, the hallway 18 may make a bend perpendicular to the axis 16 to extend along a second leg 19 perpendicular to the first leg 17.

An object 20 for identification may be positioned in the second leg 19. Generally, the object 20 will be removed from a direct line-of-sight 22 of an optical field sampler 24, for example, the latter placed adjacent to the coherent light source 12 in the first leg 17. Generally, the optical field sampler 24 will have a light-receiving face directed along axis 26 ideally but not necessarily parallel to axis 16. As used herein, a line-of-sight 22 will be considered an unobstructed straight line between the object 20 and the optical field sampler 24 (in this case blocked by walls 21 of a corner of the hallway 18) or other path along which direct imaging may be obtained either as a result of refraction or specular reflection without intervening diffuse reflection. Significantly, a standard optical film camera, for example, placed at the location of the optical field sampler 24 cannot directly image the object 20 because there is no unobstructed line-of-sight 22.

The object 20 is preferably distinguishable by reflected light, that is, the object 20 does not require and preferably does not have an internal light source or alternate source of illumination. Notably the object 20 may be illuminated by indirect lighting from the coherent light source 12 which need not be positioned near the object 20 or be within a direct line-of-sight of the object 20. It is contemplated that the light from the coherent light source 12 is not modulated spatially, for example, to impose a predetermined speckle pattern on a distant surface.

Light 14 emanating from the coherent light source 12 is generally not collimated and thus expands in the cone of roughly equal intensity (dropping less than 20 percent from a full width maximum) over an angle that subtends more than five degrees and typically 45 degrees or more. This cone of light may be thereby distinguished from a collimated focal point provided by a standard collimated laser producing a pencil beam.

The light 14 from the coherent light source 12 will pass along the first leg 17 and around the corner down second leg 19 as a result of diffraction and reflection off of the walls 21 of the hallway 18. Typically, and as will be assumed in this example, the walls of the hallway 18 will be diffuse reflectors providing unknown and fine scale random attenuation and phase scattering typical of a diffuse surface such as painted wallboard or the like.

Figure 2:
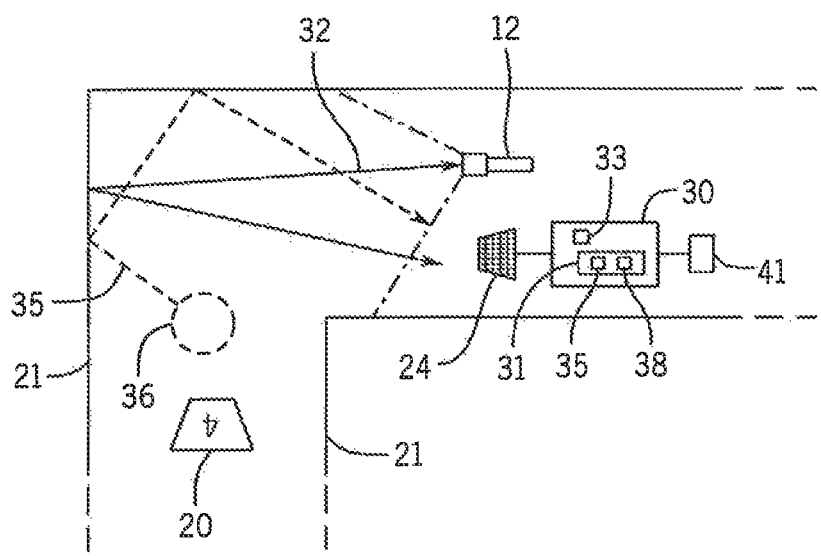
FIG. 2 is a figure similar to FIG. 1 showing two example paths of light traveling from the coherent light source to the optical field sampler after reflection from a wall and from the object being imaged.

Referring now to FIG. 2, the optical field sampler 24 may communicate with an electronic computer 30 having one or more processors 33 receiving data from the optical field sampler 24 and executing a program 35 stored in computer memory 31 associated with the processors 33. As we discussed below, the program 35 may implement a machine learning system, for example, comprised of multiple neurons arranged in layers using a set of weights 38 derived from a training set as will be discussed. The computer 30 may provide output to display 41 or a similar device that may identify the object 20, or this data may be used in a machine learning system such as a controller for a self-driving vehicle.

Generally, the optical field sampler 24 may receive two types of reflected light. The first type of light includes light beams 32, being light from the coherent light source 12 after reflection off of the environment other than the imaged object 20, for example, light 14 passing from the coherent light source 12 and bouncing off of a wall 21 in one or more reflections to return to the optical field sampler 24. Because this light will stay relatively constant with changes in the imaged object 20, it will be largely deemphasized in the training process to be described below allowing the system to work in a variety of environments. The second type of light includes object-reflected light beams 34, being light that has reflected off of the object 20 and returns to the optical field sampler 24 after one or more reflections off of walls 21 or by diffraction around the corner of the hallway. The light reflected off of the object 20 is modified by the object 20 which imprints a cluster 36 of correlated phases on the light beam 34 providing information that may survive one or more reflections off of the walls 21 before being received by the optical field sampler 24. This transmitted cluster 36 allows the object 20 to be uniquely identified among a set of objects for which the system 10 is trained.

Figure 3:
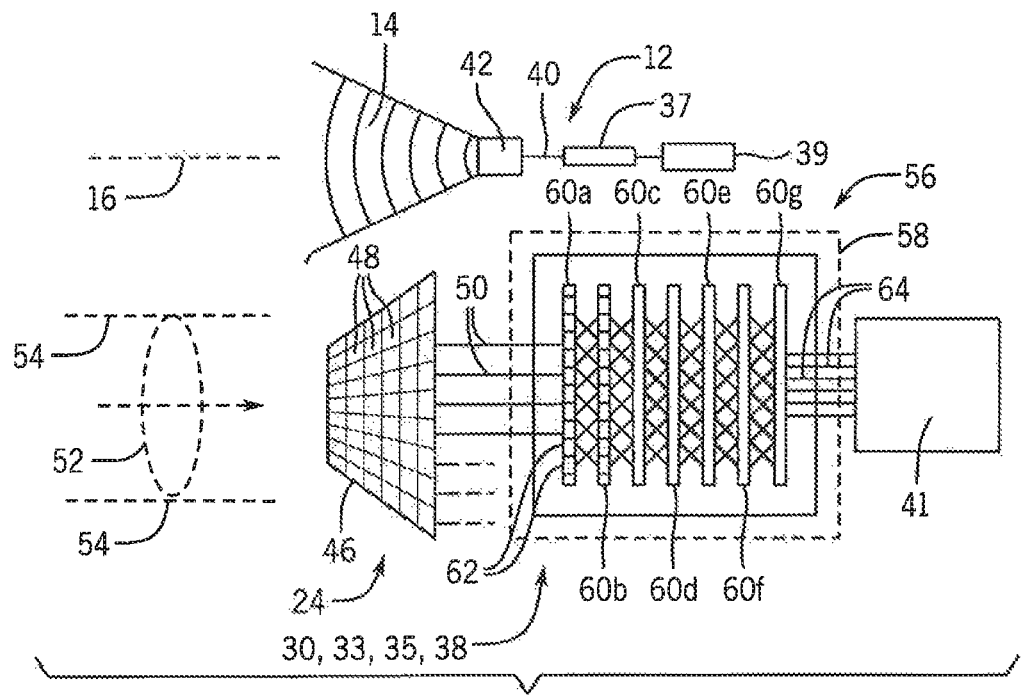
FIG. 3 is a detailed block diagram of the coherent light source and the optical field sampler.

Referring now to FIGS. 1 and 3, the coherent light source 12 may be, for example, a standard continuous wave laser 37 driven by a laser power supply 39 to emit a narrow, collimated pencil beam 40 of coherent light in the visible range. Alternatively, a pulsed coherent source can be used such as pulsed laser. Typically, this light will have a narrow bandwidth (for example, of less than one gigahertz) to approximate monochromatic light. This pencil beam of light may pass through a beam expander 42 to provide a broad illuminating beam of light 14 (shown in FIG. 1) directed down the hallway 18. Generally, this light 14 will be un-collimated and thus does not provide a point illumination of the type projected by a normal laser but rather a substantially uniform illumination of an area that would fully illuminate the object 20 if the object 20 were placed directly in the path of the light 14 along axis 16.

Referring still to FIG. 3 the optical field sampler 24 in one embodiment presents a solid-state pixel array 46 having pixels 48, for example, regularly spaced in rows and columns over a two-dimensional area. Each pixel 48 can develop an independent electrical signal 50 providing a measurement of light received over the area of that pixel 48. In this diagram, the pixel array 46 is shown keystoned to represent a perspective foreshortening but typically will be a rectangular array.

The light received by the pixel array 46 may first pass through an optional lens 52 principally providing field-of-view collimation rather than a focusing function; however, the invention contemplates that no lens 52 is required for the purpose of focusing an image on the surface of the pixel array 46 and instead a simple tubular light shield 54 or collimating mask or stop may be adopted for this purpose of reducing the influence of highly oblique and excessively scattered light on the measurements of the pixels 48. The pixel 48 may employ standard light sensing technologies, for example, using solid-state devices such as CMOS light sensors commonly used in digital cameras albeit the spacing or spatial resolution of the pixels 48 may desirably be smaller than that used for standard cameras in some embodiments.

Each of the independent signals 50 from the pixel array 46 may be received as a data value (for example, after processing by an analog-to-digital converter) for further processing by a machine learning system 56. In one embodiment, the machine learning system 56 may be a multilayer neural net 58. The neural net 58 may be implemented by discrete circuitry for this purpose or in this embodiment by the computer 30 through a combination of the processor 33 executing a program 35 and using training weights 38 as will be developed below.

For example, the program 35 may be a convolution neural network, for example, implemented using the TensorFlow program, an open-source program developed by Google and widely available. This program 35 may execute on processors 33 following standard 64-bit computer architectures, including but not limited to individual or combinations of computer processing units (CPUs), graphical processing units (GPU's), or special-purpose low-precision application-specific integrated circuits (ASIC).

In one embodiment, the neural net 58 may provide for seven layers 60a-60g of multiple neurons 62 including a first input layer 60a having a neuron for each of the signals 50 followed by convolution layers 60b. The convolution layer 60b applies a convolution filter to the data. A pooling layer 60c follows the convolution layers 60b to provide a down sampling of the data which is then received by a second convolution layers 60d providing additional convolution filter. Second convolution layer 60d is in turn connected to a second pooling layer 60e. This pooling layer 60e provides data to a dense layer 60f followed by a second dense layer 60g having a neuron for each classification to provide a set of identification signals 64 whose relative magnitudes indicate a likelihood that the object 20 is a particular object in a finite set of objects forming a class, for example, a given number in a predetermined set of numbers.

Figure 4:
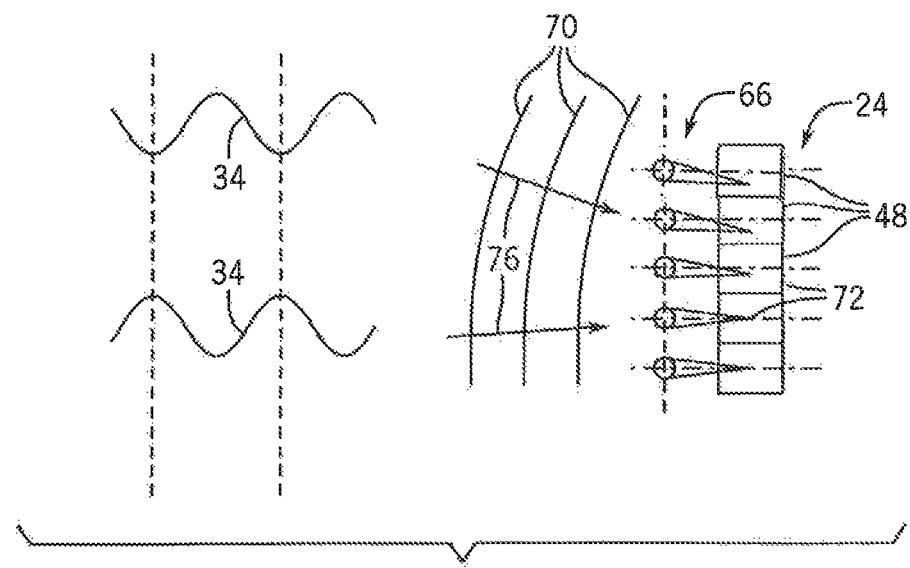
FIG. 4 is a simplified one-dimensional representation of a phase sensitive optical field sampler that can be used with the present invention.

Referring now to FIG. 4, in one embodiment the pixels 48 of the optical field sampler 24 may be light-phase sensitive elements, for example, implementing a Shack-Hartman type phase sensitive array in which each pixel 48 is associate with a micro lens 66 or aperture so that an incoming wavefront 70 of light beam 34 produces a focal spot 72 on the pixel 48 whose offset from the center of the pixel 48 and the optical axis of the micro lens 66 indicates an angle 76 of the propagating wavefront. This angle 76 relates to a relative phase shift in the wavefront 70 either ahead or behind adjacent portions of the wavefront 70. The pixels 48 are able to measure this offset (for example, by each fixed pixel 48 being composed of individually sensed sub pixels in a tiled form) to provide an indication of relative phase shift in the incoming waveform. Ideally the offset may be measured in two dimensions so that a two-dimensional phase surface can be developed. This phase shift information is then used to characterize the cluster 36 reflected from the object 20 shown in FIG. 2.

Figure 5:
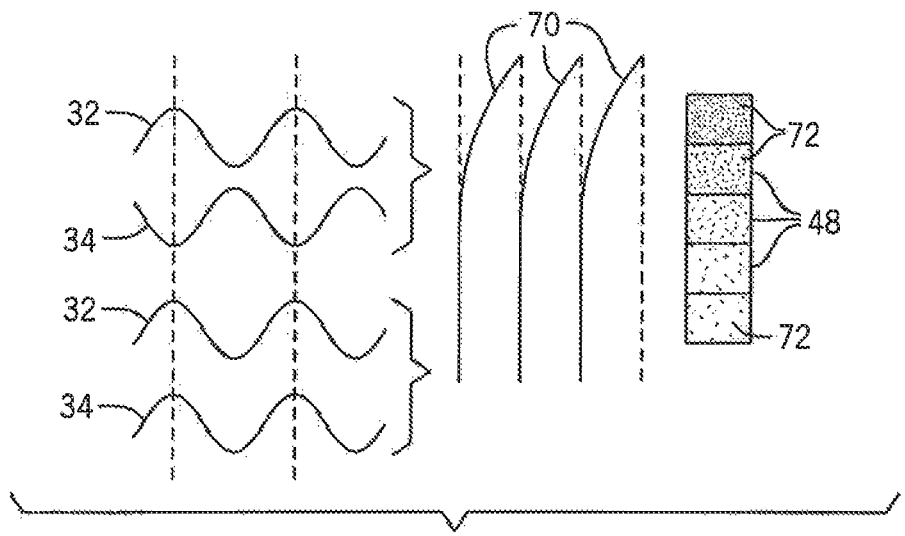
FIG. 5 is a figure similar to FIG. 4 showing a conventional intensity sensitive optical field sampler as may alternatively be used in the present invention.

Referring now to FIGS. 2 and 5, present inventors surmise that a narrowly designed phase sensitive element may not be necessary because of the inherent phase sensitivity that can be obtained using pixels 48 limited to measuring intensity of received light. This phase sensitivity results from light interference, for example, between light beams 32 and 34 in practical application. For example, when light beams 32 and 34 have a relative phase shift such as to create destructive interference, an intensity of received light 72 at a given pixel 48 will be decreased with respect to the intensity of received light 72' when there is constructive interference between light beams 32 and 34.

Figure 6:
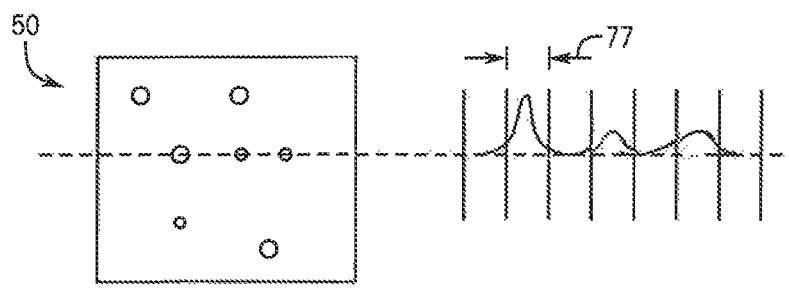
FIG. 6 is an example speckle image processed by the present invention showing a desired resolution of the optical field sampler with respect to speckle features.

Referring now to FIG. 6, the signals 50 produced by the pixel array 46 may describe a speckle pattern of interfering light received at the two-dimensional surface of the pixel array 46. Ideally, the spatial resolution of the pixels 48 represented by an inter-pixel spacing 77 of pixels in regular rows and columns will be such as to resolve the speckles, for example, according to the Nyquist sampling requirements. This speckle phase information forms the feature set extracted by the machine learning system 56.

Figure 7:
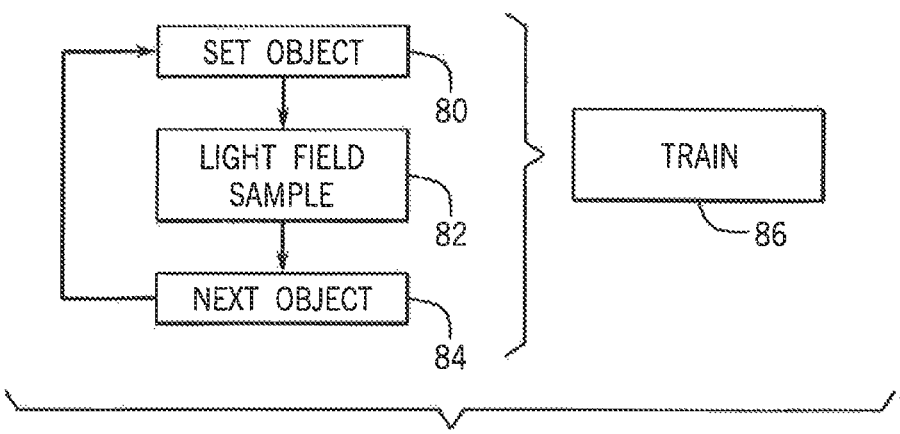
FIG. 7 is a flowchart showing the steps of training the machine learning system used with the present invention.

Referring now to FIGS. 3 and 7, generally each of the layers 60 and 62 operate by implementing weighted connections between neurons (not shown) of each layer 60 and 62. These weights are established through use of a training set that is used to train the machine learning system 56. The training set includes set elements that each link signals 50 obtained for a particular object 20 to an identification of the object 20 so that the neural net may learn to associate signals 50 with objects 20. For this purpose, a finite set of objects 20 may be defined, for example, handwritten numbers from 0 to 9. Multiple set elements will be developed for each object 20 with the object 20 varied slightly between the different elements, for example, scaled, rotated, or otherwise displaced or modified to provide improved robustness against misalignment.

This training process begins by positioning the object as indicated by process block 80 where a particular object 20 is selected. At process block 82, light signals 50 are collected for that object 20 linked to the identification of the object 20 to provide a training set element. The light signals 50 will also be obtained with each object 20 out of the line-of-sight 22 using equipment and an environment similar but not necessarily identical to that shown in FIG. 1. In particular the hallway dimensions or wall surfaces may be varied.

At process block 84, a new object 20 is selected and this process is repeated until an entire training set is developed. The training set is then used to train the neural net 58 per process block 86 using standard training techniques to produce the weights 38 described with respect to FIG. 2. These weights 38 may then be used to process the signals 50 from an unknown object 20 with the signals 64 from dense layer 62 identifying the particular object 20 even though the object 20 cannot be directly imaged.

Example

The present invention has been simulated using the MNIST data set as objects 20. This data set comprises 60,000 training examples in the form of images of handwritten numbers from 0 to 9 and includes 10,000 test examples. These handwritten numbers are in different rotations and styles. Each of the examples provides signals 50 in the form of 28-by-28 pixel monochrome images. These images are simulated as thin reflective plates cut out in the form of the numbers of the MNIST number. Each pixel is sized to span approximately 5 wavelengths of the light of the simulated coherent light source 12. The simulated coherent light source 12 is simulated as being "far field" thus providing a uniform coherent illumination directly on the object 20. A diffusive wall was placed fifty wavelengths away from the object 20 in parallel to the object 20 and the sensor array placed 50 wavelengths away from the diffusive wall to measure intensity and phase of light from the simulated coherent light source 12 (for example over a 28-by-28 matrix of sensors) only after it had bounced off of the diffusive wall. The diffusive wall was simulated as providing random reflectivity and phase delay over its surface. The neural net was trained for 30 epochs and ultimately obtained 90 percent accuracy.

The identification of the objects 20 in this simulation exhibited robustness with respect to misalignment of the object 20 by one-half wavelength of translation of the object 20 in the X and Y directions along the plane of the object 20.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context. Substantially shall be understood to mean plus or minus five percent of the indicated target value. The term "non-specular reflection" refers to diffuse reflection off of a rough surface that provides practically random phase shifts and reflectivity angle and intensity. "Line-of-sight" means a path of light transmission without intervening non-specular reflection such as would prevent the capture of an image.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

The invention claimed is:

1. An optical system for non-line-of-sight object identification comprising:
   a coherent light source;
   an optical field sampler providing a two-dimensional array of light sensor elements, the array positionable to receive reflections of light from a non-line-of-sight object illuminated by the coherent light source to produce a corresponding array of light sensor signals; and a machine learning system receiving the array of light sensor signals and processing them according to training by a training set of light sensor signals to identify a given object within an object class of different objects, wherein the training set links different objects of the object class to light sensor signals associated with the different objects when those different objects are not within a line-of-sight of a light sensor collecting the light sensor signals and are illuminated by a coherent light source.

2. The optical system of claim 1 wherein the machine learning system uses a feature set consisting of light phase at a set of positions over the two-dimensional array of light sensors.

3. The optical system of claim 2 wherein the light sensor elements each sense a phase of received light.

4. The optical system of claim 3 wherein the light sensor is a wavefront sensor.

5. The optical system of claim 1 wherein the light sensor elements each sense an intensity of received light.

6. The optical system of claim 1 wherein the light sensor signals of the training set provide values of reflected light of a non-line-of-sight object of the object class indirectly illuminated with coherent radiation communicated between the different objects and a multi-pixel sensor through at least one non-specular reflection.

7. The optical system of claim 1 wherein the coherent light source is selected from the group consisting of a laser and a beam expander and a coherent diode.

8. The optical system of claim 1 wherein the coherent light is un-collimated.

9. The optical system of claim 1 wherein the coherent light source provides light in a visible range.

10. The optical system of claim 1 wherein the coherent light source has a frequency linewidth of less than one gigahertz.

11. The optical system of claim 1 wherein machine learning system is a multilayer neural network.

12. The optical system of claim 11 wherein the machine learning system is a convolution neural net.

13. The optical system of claim 1 wherein the optical field sampler provides an electronic light sensor array receiving reflected light directly without intervening optics projecting a light image on the light sensor array.

14. A method of identifying a given object outside of a line-of-sight comprising:
(a) creating a training set of light sensor signals associated with different objects of an object class when those objects are not within a line-of-sight of a light sensor producing the light sensor signals and are illuminated by a coherent light source;
(b) training a machine learning system using the training set;
(c) illuminating a given object with coherent light and collecting reflected light at a location outside of the line-of-sight of the object; and
(d) processing the collected light using the trained machine learning system to identify a given object within the object class based on the collected light.

15. The method of claim 14 wherein at step (c) the object is illuminated indirectly by the coherent light after the coherent light is reflected off of at least one non-specular reflector.

16. The method of claim 14 wherein the training set created at step (a) is created in a different environment than that of the object illuminated at step (c).

17. The method of claim 14 wherein the light is collected with a spatial resolution permitting discrimination of optical speckle caused by constructive and destructive interference in reflected light from the given object.

* * * * *